(12) United States Patent
Chen

(10) Patent No.: US 8,451,516 B2
(45) Date of Patent: May 28, 2013

(54) APPARATUS AND METHOD FOR SCANNING BOUND DOCUMENT

(75) Inventor: Yen-Cheng Chen, Hsinchu (TW)

(73) Assignee: Avision Inc. (TW)

( * ) Notice: Subject to any disclaimer, the term of this patent is extended or adjusted under 35 U.S.C. 154(b) by 793 days.

(21) Appl. No.: 12/646,920

(22) Filed: Dec. 23, 2009

(65) Prior Publication Data

US 2010/0157381 A1   Jun. 24, 2010

(30) Foreign Application Priority Data

Dec. 24, 2008   (TW) ............................... 97150519 A

(51) Int. Cl.
*H04N 1/04* (2006.01)

(52) U.S. Cl.
USPC ........... 358/497; 358/488; 358/486; 358/474; 358/483; 358/482

(58) Field of Classification Search
USPC ................. 358/488, 486, 497, 474, 483, 449, 358/505, 494, 482; 399/362; 355/25; 250/234–236, 239, 216; 382/313, 318, 319
See application file for complete search history.

(56) References Cited

U.S. PATENT DOCUMENTS

| 4,713,550 | A  | * | 12/1987 | Anzai et al. ................. 250/559.2 |
| 5,012,275 | A  |   | 4/1991  | Bock |
| 7,509,087 | B2 | * | 3/2009  | Lin ............................... 399/365 |
| 7,630,105 | B2 |   | 12/2009 | Sheng et al. |
| 2005/0088708 | A1 | * | 4/2005 | Sheng et al. ................... 358/487 |
| 2005/0275905 | A1 | * | 12/2005 | Huang ........................... 358/474 |
| 2007/0081174 | A1 | * | 4/2007 | Peck et al. ..................... 358/1.7 |
| 2010/0079821 | A1 | * | 4/2010 | Hirano ........................... 358/448 |

FOREIGN PATENT DOCUMENTS

| JP | 03058069 A | * | 3/1991 |
| TW | 200520531  |   | 6/2005 |

OTHER PUBLICATIONS

Office Action of Counterpart application by Taiwan IP Office on May 16, 2012.

* cited by examiner

*Primary Examiner* — Cheukfan Lee

(57) ABSTRACT

An apparatus for scanning a bound document is provided. The apparatus comprises a casing, an image-capturing assembly, at least a sensor and a controller. The casing has a first platen and a second platen disposed adjacent to each other, wherein the first platen having a scanning region is provided to support the bound document. The image-capturing assembly is disposed under the first platen for capturing an image of the bound document within the scanning region and generating an image signal. At least a sensor is disposed on the second platen for detecting the presence of the bound document. The sensor transmits a detection signal responsive to detection of the document presence. The controller is electrically connected to the image-capturing assembly and the sensor for executing a book-scanning mode responsive to the detection signal received from the sensor.

19 Claims, 4 Drawing Sheets

APPARATUS AND METHOD FOR SCANNING BOUND DOCUMENT

This application claims the benefit of Taiwan application Serial No. 97150519, filed Dec. 24, 2008, the subject matter of which is incorporated herein by reference.

BACKGROUND OF THE DISCLOSURE

1. Technical Field

The invention relates in general to an apparatus and a scanning method thereof, and more particularly to an apparatus and a method used in the apparatus for scanning a bound document or book.

2. Description of the Related Art

Due to the advance in the image scanning technology, scanners have played an important role both in the household and the business environment. Scanners capture the images of physical objects (such as documents, photos or books) and transmit the image data of the physical objects as an electronic file to a computer. In this way physical objects are digitalized and users can conveniently transmit or edit the image data.

Conventionally, there are two types of scanners, namely, the flatbed scanner and the sheet-fed scanner. The sheet-fed scanner automatically feeds in and scans a large volume of documents, saving the users both time and labor spent on document scanning. The flatbed scanner is mainly used for scanning a single-sheet document, a thick cardboard or a bound document or book. Examples of scanners, which are designed to scan bound documents or books, are disclosed in United States Patent Publication US 2005/0243386, and U.S. Pat. Nos. 5,777,660 and 5,712,718.

SUMMARY OF THE INVENTION

The invention is directed to an apparatus and a method used in the apparatus for scanning a bound document. When a bound document such as a book is scanned, the apparatus automatically executes a book-scanning mode, such that users can quickly and easily complete the scanning process.

According to a first aspect of the present invention, an apparatus for scanning a bound document is provided. The apparatus comprises a casing, an image-capturing assembly, at least a sensor and a controller. The casing has a first platen and a second platen disposed adjacent to the first platen, wherein the first platen has a scanning region and is provided for supporting the bound document. The image-capturing assembly is disposed inside the casing and under the first platen for capturing an image of the bound document within the scanning region and generating an image signal correspondingly. At least a sensor is disposed on the second platen for detecting the presence of the bound document and transmitting a detection signal responsive to detection of the document presence. The controller disposed inside the casing is electrically connected to the image-capturing assembly and the sensor, for executing a book-scanning mode responsive to the detection signal received from the sensor.

According to a second aspect of the present invention, a method used in an apparatus for scanning a bound document (such as a book) is provided. The scanning method comprises the steps of detecting a bound document placed on a first platen of the apparatus and transmitting a detection signal responsive to detection of presence of the bound document by a sensor disposed on a second platen of the apparatus; initiating a book-scanning mode responsive to the detection signal; and scanning the bound document in the book-scanning mode. The apparatus sets a first initial point as the scan origin in the normal scanning mode and a second initial point as the scan origin in the book-scanning mode.

The invention will become apparent from the following detailed description of the preferred but non-limiting embodiments. The following description is made with reference to the accompanying drawings.

DETAILED DESCRIPTION OF THE INVENTION

The invention provides an apparatus and a method for scanning a bound document. Other than scanning bound documents, the apparatus can also be used for scanning unbound sheets of documents. The apparatus automatically executes a book-scanning mode in response to a detection signal and provides a fast and effective document scan.

<Apparatus for Scanning a Bound Document>

Figure 1:
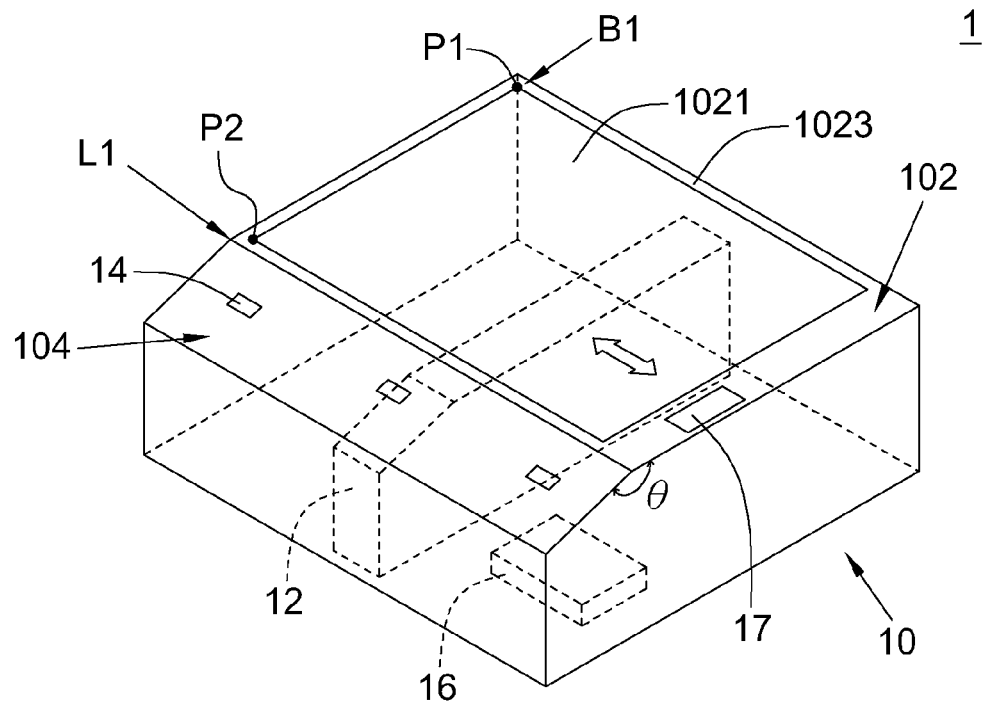
FIG. 1 shows an apparatus for scanning a document according to a preferred embodiment of the invention.

Referring to FIG. 1, an apparatus for scanning a document according to a preferred embodiment of the invention is shown. The apparatus 1 comprises a casing 10, an image-capturing assembly 12, a sensor 14 and a controller 16. The apparatus 1 may be a document scanner. The casing 10 has a first platen 102 for supporting the document and a second platen 104 disposed adjacent to the first platen 102. The first platen 102 has a scanning region. A border line L1 is located between the first platen 102 and the second platen 104. The first platen 102 comprises a transparent window 1021 and an opaque region 1023 surrounding the transparent window 1021. The scanning region is located inside the transparent window 1021 and within the movement range of the image-capturing assembly 12. An alignment base line B1 is disposed on the transparent window. In the present embodiment of the disclosure, the alignment base line B1 is perpendicular to the border line L1. The scanning region has a first initial point P1 and a second initial point P2 respectively located at two ends of the alignment base line B1 of the transparent window 1021. The second initial point P2 is located closer to the second platen 104 than the first initial point P1 is. The apparatus 1 further comprises a power transmission mechanism (not illustrated), which drives the image-capturing assembly 12 to move reciprocally along a path parallel to the border line L1.

The image-capturing assembly 12 is disposed inside the casing 10 and under the first platen 102 for capturing an image of the document in the scanning region and generating an image signal. The image-capturing assembly 12 comprises elements, such as an image sensor for capturing an image of the document in the scanning region and an analog-to-digital converter for converting signals.

The sensor 14 is disposed on the second platen 104 and near the border line L1 between the first platen 102 and second platen 104. The sensor 14 detects the presence of the document and transmits a detecting signal responsive to the detection of the document presence. Examples of applicable sensors include optical sensors, such as infrared sensors, and mechanical sensors, such as pressure sensors or arm sensors.

The controller 16 disposed inside the casing 10 is electrically connected to the image-capturing assembly 12 and the sensor 14, and executes a book-scanning mode responsive to the detection signal received from the sensor 14. The apparatus 1 may further comprise a display unit 17 (such as a display screen), which displays the setting options of the book-scanning mode.

Figure 2:
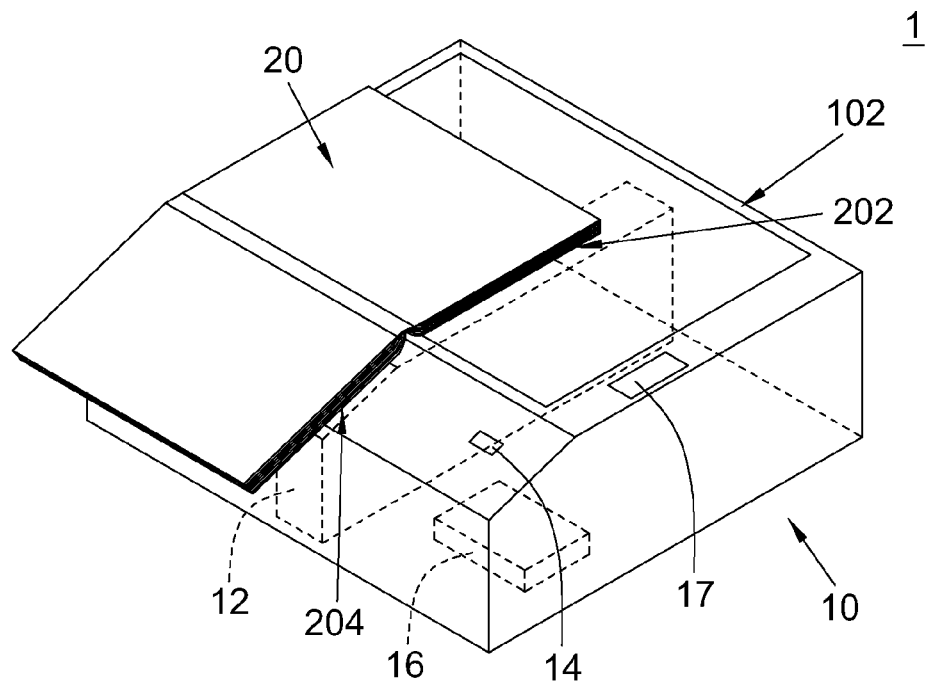
FIG. 2 shows the apparatus of FIG. 1 scanning a book.

Referring to FIG. 2, the apparatus of FIG. 1 scanning a book is shown. When the bound document is a book 20, a to-be-scanned page 202 of the book 20 is disposed in the scanning region of the first platen 102, and the second platen 104 supports a non-to-be-scanned page 204. The sensor 14 transmits the detection signal to the controller 16 responsive to the detection of the presence of the non-to-be-scanned page 104, which enables the apparatus 1 to execute a book-scanning mode. In the book-scanning mode, the controller 16 executes image procedures such as image-cropping, image-orientation or image-merging procedures on the image signal, and displays the setting options of the book-scanning mode on the display unit 17 to allow users to interact with the apparatus 1. Also, when the controller 16 enables the apparatus 1 to execute the book-scanning mode, the second initial point P2 (FIG. 1) is set as a scan origin. The position of the second initial point P2 will be considered to be (0, 0) in a reference coordinate system of the apparatus 1. If the apparatus 1 is in a normal scanning mode (i.e. the sensor 14 is not triggered), the first initial point P1 is set as the scan origin.

In FIG. 1 and FIG. 2, three sensors 14 are disposed on the second platen 104 of the apparatus 1. The number of the sensors 14 may range from 1 to n, where n is an integer equal to or greater than 2. The number of the sensors 14 disposed may be dependent on the size and functionality of the apparatus 1.

Figure 3:
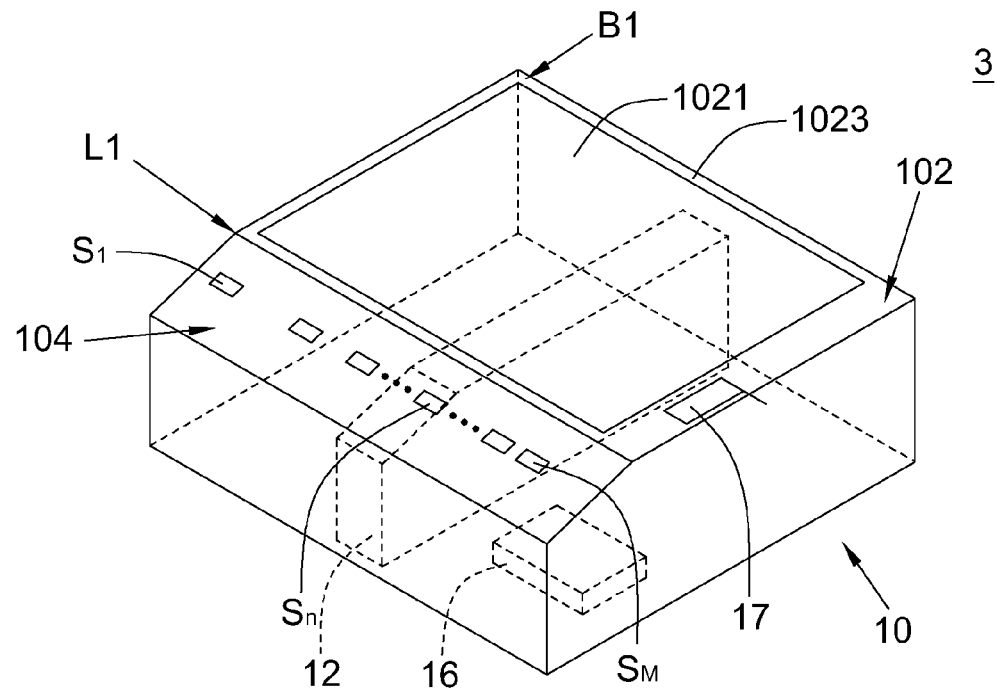
FIG. 3 shows an apparatus according to another embodiment of the invention.
Figure 4:
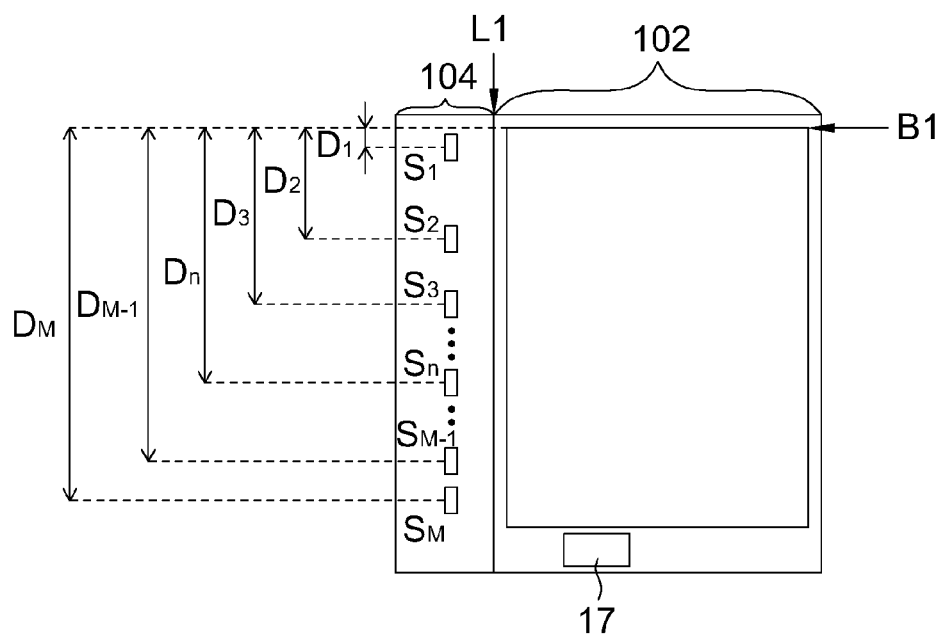
FIG. 4 is a top view of the apparatus of FIG. 3.

Referring to both FIG. 3 and FIG. 4. FIG. 3 shows an apparatus according to another embodiment of the invention. FIG. 4 is a top view of the apparatus of FIG. 3. The structures and the relations of other parts of the apparatus 3 not described in detail herein are identical or corresponding to those indicated by the same reference numerals in FIG. 1. In FIG. 3, the apparatus 3 has M sensors disposed on the second platen 104 of the casing 10 and adjacent to the border line L1 between the first platen 102 and the second platen 104, where M is a positive integer equal to or greater than 2. Moreover, the sensors $S_1, \ldots S_n, \ldots S_M$ are respectively disposed at a set of particular positions, and respectively transmit a detection signal to the controller 16 responsive to the detection of the document presence. The controller 16 determines the size of the document according to the detection signals received. The sensors $S_1, \ldots S_n, \ldots S_M$ at different positions are used for detecting the documents of different sizes. For example, in FIG. 3 and FIG. 4, the sensor $S_1$ is used for detecting a small-sized document, the sensor $S_n$, is used for detecting a middle-sized document, and the sensor $S_M$ is used for detecting a large-sized document, and the intervals between every two adjacent sensors may be or may not be the same. That is, the interval between the sensors $S_1$ and $S_2$ may be or may not be equal to the interval between the sensors $S_M$ and $S_{M-1}$.

As indicated in FIG. 4, the M sensors $S_1, \ldots S_n, \ldots S_M$ disposed on the second platen 104 and near the border line L1 are electrically connected to the controller 16, and the vertical distance from the first sensor $S_1$ to the alignment base line B1 of FIG. 3 is $D_1$. Likewise, the vertical distances from the second sensor $S_2$, the third sensor $S_3$, the n-th sensor $S_n, \ldots$, the (M-1)-th sensor $S_{M-1}$ and the M-th sensor $S_M$ to the alignment base line B1 are respectively $D_2, D_3, \ldots, D_n, \ldots, D_{M-1}$ and $D_M$. The vertical distances may correspond to the M different sizes of the bound documents respectively. For example, the vertical distance $D_n$ from the N-th sensor ($1 \leq N \leq M$, N is a positive integer) to the alignment base line B1 (FIG. 3) corresponds to a size N of the bound document. When the apparatus 3 scans a book of the size N, the non-to-be-scanned page of the book interrupts the infrared radiating between the transmission end and the reception end of the sensor $S_n$, or blocks the ambient light off the reception end of the sensor $S_n$ (being an optical sensor), or applies a pressure on the sensor $S_n$ (being a mechanical sensor) to trigger a detection signal from the sensor $S_n$ (or any/some of the sensors $S_1 \sim S_n$) to the controller 16, and the controller 16 controls the apparatus 3 to execute a book-scanning mode according to the detection signal(s) received. In this way, the controller 16 determines the size of the bound document.

In addition to the standard document sizes A4, A5, A6, B4, and B5, the bound document may be a book of a non-regular size, such as a squared book of a size of 26 cm×26.5 cm. Thus, in practice, the manufacturers of the apparatus may select M sizes most commonly used in a local market, and determine the number and the positions of the sensors be disposed on the apparatus 3 (such as the positions of M sensors of FIG. 3 and FIG. 4), so as to satisfy the actual needs of the local market.

In the present embodiment of the invention, the second platen 104 is disposed in an inclined position to the first platen 102. An included angle θ, greater than 90 degrees but less than 180 degrees, is formed between the first platen 102 and the second platen 104. However, the second platen 104 can also be disposed at a right angle to the first platen 102. If the second platen 104 is disposed at a right angle to the first platen 102, then the sensors 14 (or $S_1 \sim S_n$) can be disposed on the second platen 104 and adjacent to the border line L1, or on the first platen 102 and near the border line L1, but outside the scanning region, so that the image-scanning result is not affected by the disposition of the sensors 14 (or $S_1 \sim S_n$).

<Method Used in an Apparatus for Scanning a Bound Document>

Figure 5:
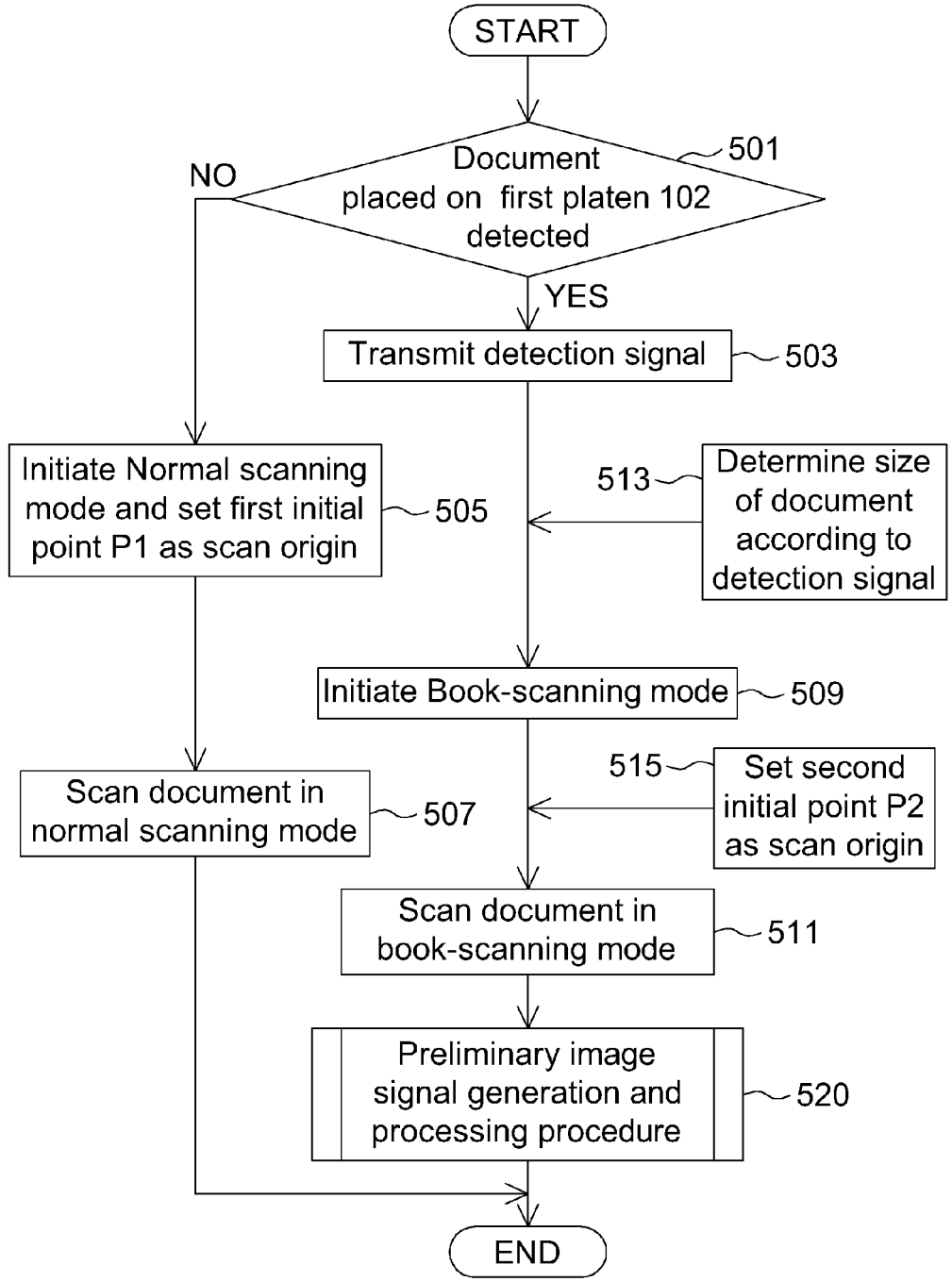
FIG. 5 is a flowchart of a method used in an apparatus for scanning a bound document according to the embodiment of the invention.

FIG. 5 is a flowchart of a method used in an apparatus for scanning a a bound document according to the embodiment of the invention. Please refer to both FIG. 1 and FIG. 2 for the structure and configuration of the apparatus using the method. Firstly, the method begins at step 501, the sensor 14 disposed on the second platen 104 detects a document placed on the first platen 102. The sensor 14 transmits a detection signal to the controller 16 in response to the detection of the presence of the document as in step 503. If the detection signal is not transmitted (for example, when a single-sheet document is placed on the first platen 102, the single-sheet document does not trigger the transmission of the detection signal from the sensor 14), then the method proceeds to step 505, the apparatus 1 initiates a normal scanning mode and sets a first initial point P1 as a scan origin. Afterwards, the method proceeds to step 507, the single-sheet document is scanned in the normal scanning mode. If the detection signal is transmitted (that is, when a bound document or a book is scanned, a non-to-be-scanned page of the bound document triggers the transmission of the detection signal from the sensor 14), then the method proceeds to step 509, the apparatus 1 initiates a book-scanning mode according to the detection signal. Then, the method proceeds to step 511, the bound document is scanned in the book-scanning mode.

Figure 6:
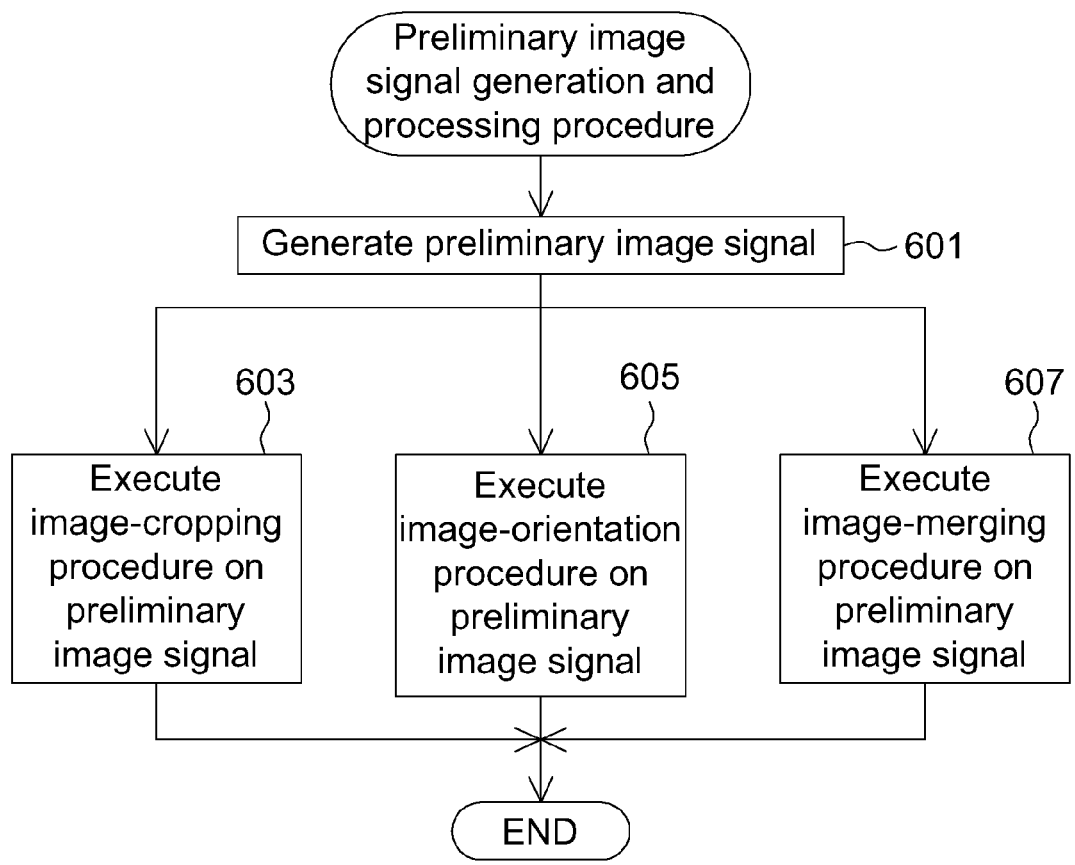
FIG. 6 is a flowchart showing a detail of a procedure for generating and processing a preliminary image signal according to the embodiment of the invention.

After the apparatus 1 scans the bound document in the book-scanning mode, the method may further comprise a step of generating and processing a preliminary image signal (step 520). Please refer to FIG. 6. FIG. 6 is a flowchart showing a detail of a procedure for generating and processing the preliminary image signal according to the embodiment of the invention. In step 601, the apparatus 1 first generates the preliminary image signal corresponding to the scanning region and then processes the preliminary image signal. In the book-scanning mode, the apparatus 1 may determine the image size of the preliminary image signal, or execute an image-cropping procedure on the preliminary image signal, as in step 603, to obtain a processed image signal corresponding to the image of the document within the scanning region, an image-orientation procedure to obtain a processed image signal having a specific orientation, as in step 605, or an image-merging procedure to obtain a processed image signal of a merged image, as in step 607.

Moreover, when the sensor 14 detects that the document placed on the first platen 102 is a bound document and the controller 16 executes a book-scanning mode, the apparatus in the book-scanning mode may execute other adjustments, such as increasing the luminance of the scanning light source.

It is assumed that the apparatus 1 is an A4 document scanner and the bound document is a book of a size of 17 cm×11.5 cm. After the book is scanned, the preliminary image signal obtained is about an A4-sized image data. In the book-scanning mode, an image-cropping procedure is performed to crop the image of the preliminary image signal to trim off the blank area, so that a processed image signal corresponding to the bound document of the original size is obtained.

When scanning a book, the apparatus 1 executes an image-orientation or image-merging procedure to obtain a processed image signal having a specific orientation or a merged image. Take the image-orientation procedure for example. The preliminary scanned image corresponding to a left-hand side page of the book is an image in reverse orientation to that of the preliminary scanned image corresponding to a right-hand side page of the book. Thus, the preliminary image signals corresponding to consecutive pages of the book consist of upright and upside-down images. In the book-scanning mode, the image-orientation procedure automatically rotates the upside-down image by 180 degrees, so that all of the processed image signals represent images in the same orientation.

When the apparatus scans a bound document, the binding region of the document is kept a distance away from the scanning region, which makes it difficult to flatly place the document on the transparent window; therefore, the image-capturing assembly inevitably obtains a distorted image of the document. In the book-scanning mode according to the embodiment, the apparatus increases the luminance of the scanning light source (particularly, increasing the amount of the light beams close to the border line L1 between the first platen 102 and the second platen 104) to provide the binding region with a higher illuminance and thus enhance the preliminary image signal to improve the image quality and solve the problem of image distortion.

The method may further comprise a step of changing the scan origin in the book-scanning mode and setting a second initial point P2 as the scan origin, as in step 515 of FIG. 5. Referring to FIG. 1, the scanning region has the first initial point P1 and the second initial point P2. If the sensor 14 does not transmit a detection signal, the document is determined as an unbound document (e.g., a sheet of paper); and the apparatus 1 sets the first scan point P1 as the scan origin (step 505) and scans the document in the normal scanning mode (step 507). If the sensor 14 transmits a detection signal, the document is determined as a bound document; and the apparatus sets the second scan point P2 as the scan origin (step 515) and scans the document in the book-scanning mode (step 511).

The method may further comprise a step of determining a size of the bound document according to the detection signal, as in step 513 of FIG. 5. Please also refer to the apparatus 3 of FIG. 3 and FIG. 4. As the bound document is placed on the first platen 102, subject to the size of the bound document, only some of the sensors $S_1 \sim S_n$, are covered by the bound document, that is, only some of the sensors $S_1 \sim S_n$, would transmit a detection signal. Thus, the controller 106 may determine the size of the bound document according to the detection signals transmitted by the sensors $S_1 \sim S_n$.

The addition of the sensors 14 and the automatic mode switching mechanism simplify the operation of the apparatus and shorten the processing of the image signals.

According to the apparatus disclosed in the above embodiment of the invention, one or more than one sensor is used for determining whether the to-be-scanned document is a bound document and for determining the size of the bound document. When a bound document is scanned, the apparatus automatically executes a book-scanning mode, so that the user can quickly and easily complete the scanning procedure.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for scanning a bound document, comprising:
   a casing, comprising:
   a first platen, having a scanning region, for supporting the bound document; and
   a second platen disposed adjacent to the first platen;
   an image-capturing assembly disposed inside the casing and under the first platen for capturing an image of the bound document within the scanning region and generating an image signal correspondingly;
   at least a sensor disposed on the second platen of the casing for detecting the presence of the bound document and transmitting a detection signal responsive to detection of the document presence; and
   a controller, disposed inside the casing and electrically connected to the image-capturing assembly and the sensor, for executing a book-scanning mode responsive to the detection signal received from the at least one sensor, and determining a size of the bound document according to the detection signal received.

2. The apparatus according to claim 1, wherein the at least one sensor is disposed on the second platen near a border line between the first platen and the second platen.

3. The apparatus according to claim 1, wherein an included angle between the second platen and the first platen is greater than 90 degrees but less than 180 degrees.

4. The apparatus according to claim 1, wherein the first platen is provided to support a to-be-scanned page of the bound document.

5. The apparatus according to claim 4, wherein the second platen is provided to support a non-to-be-scanned page of the bound document and the at least one sensor transmits the detection signal to the controller responsive to the detection of the presence of the non-to-be-scanned page.

6. The apparatus according to claim 1, wherein each of M sensors is disposed at a specific position on the second platen, where M is a positive integer equal to or greater than 2, and the M sensors transmit the detection signals to the controller responsive to the detection of the bound document presence, and the controller determines the size of the bound document according to the detection signals received.

7. The apparatus according to claim 1, wherein the first platen has a transparent window, the scanning region is located inside the transparent window and within a movement range of the image-capturing assembly, and an alignment base line is disposed on the transparent window and substantially perpendicular to a border line between the first platen and the second platen.

8. The apparatus according to claim 7, wherein the scanning region has a first initial point located at one end of the alignment base line and a second initial point located at the other end of the alignment base line, wherein the second initial point is located closer to the second platen than the first initial point is.

9. The apparatus according to claim 8, wherein, in the book-scanning mode, the second initial point is used as a scan origin, and, in a normal scanning mode, the first initial point is used as the scan origin.

10. The apparatus according to claim 1, wherein, in the book-scanning mode, the controller executes at least one of image-cropping, image-orientation and image-merging procedures on the image signal.

11. The apparatus according to claim 1, further comprising a display unit, wherein, in the book-scanning mode, the display unit displays a plurality of setting options of the book-scanning mode.

12. The apparatus according to claim 1, wherein the at least one sensor is a mechanical sensor.

13. The apparatus according to claim 1, wherein the at least one sensor is an optical sensor.

14. The apparatus according to claim 1, further comprising a power transmission mechanism for driving the image-capturing assembly to move reciprocally along a path parallel to a border line between the first platen and the second platen.

15. A method used in an apparatus for scanning a bound document, wherein the apparatus comprises a first platen and a second platen disposed adjacent to the first platen and sets a first initial point as a scan origin in a normal scanning mode, the method comprising the steps of:

detecting the bound document placed on the first platen and transmitting a detection signal responsive to detection of presence of the bound document by a sensor disposed on the second platen;

determining a size of the bound document according to the detection signal transmitted by the sensor;

initiating a book-scanning mode responsive to the detection signal; and scanning the bound document in the book-scanning mode.

16. The method according to claim 15, wherein, after the step of scanning the bound document, the method further comprising the steps of:

generating a preliminary image signal corresponding to the scanning region; and processing the preliminary image signal.

17. The method according to claim 16, wherein the step of processing the preliminary image signal comprises:

executing an image-cropping procedure on the preliminary image signal for obtaining a processed image signal corresponding to an image of the bound document within the scanning region.

18. The method according to claim 16, wherein the step of processing the preliminary image signal comprises:

executing an image-orientation procedure on the preliminary image signal for obtaining a processed image signal having a specific orientation.

19. The method according to claim 15, further comprising the step of:

setting a second initial point as the scan origin.

* * * * *